(12) United States Patent
Page et al.

(10) Patent No.: US 6,175,821 B1
(45) Date of Patent: Jan. 16, 2001

(54) GENERATION OF VOICE MESSAGES

(75) Inventors: Julian H. Page, Ipswich; Paul Murrin, York, both of (GB)

(73) Assignee: British Telecommunications public limited company, London (GB)

( * ) Notice: Under 35 U.S.C. 154(b), the term of this patent shall be extended for 0 days.

(21) Appl. No.: 09/125,707

(22) PCT Filed: Jul. 31, 1998

(86) PCT No.: PCT/GB98/02299

§ 371 Date: Apr. 26, 1999

§ 102(e) Date: Apr. 26, 1999

(87) PCT Pub. No.: WO99/07132

PCT Pub. Date: Feb. 11, 1999

(30) Foreign Application Priority Data

Jul. 31, 1997 (EP) .................................. 97305798

(51) Int. Cl.[7] ...................................... G10L 13/00
(52) U.S. Cl. .......................... 704/258; 704/270; 704/265; 704/260
(58) Field of Search .................................. 704/270, 260, 704/265, 258, 207

(56) References Cited

U.S. PATENT DOCUMENTS

| | | | |
|---|---|---|---|
| 5,592,585 | * 1/1997 | Coile et al. | 704/206 |
| 5,727,120 | * 3/1998 | Coile et al. | 704/206 |
| 5,774,855 | * 6/1998 | Foti et al. | 704/267 |
| 5,850,629 | * 12/1998 | Holm et al. | 704/260 |

FOREIGN PATENT DOCUMENTS

| | | |
|---|---|---|
| 0 405 029 | 1/1991 | (EP) . |
| 96/32711 | * 3/1996 | (EP) ................. G10L/5/04 |
| WO94/17517 | 8/1994 | (WO) . |
| WO96/32711 | 10/1996 | (WO) . |

OTHER PUBLICATIONS

Breen, A.P., 'Speech Synthesis Models: A Review', Electronics & Communication Engineering Journal, Feb. 1992.

Breen, A.P. and Page, J.H., 'Designing the Next Generation of Text–To–Speech Systems'.

Moulines E. & Charpentier F, 'Pitch–Synchronous Waveform Processing Techniques for Text–To–Speech Synthesis using Diphones', Speech Communication 9, Elsevier Science Publishers (1990).

"Computer Synthesis of Speech by Concatenation of Formant–Coded Words" Rabiner L.R. et al., The Bell System Technical Journal, vol. 50, No. 5, May 1971–Jun. 1971, pp 1541–1558.

* cited by examiner

*Primary Examiner*—David R. Hudspeth
*Assistant Examiner*—Daniel Abebe
(74) *Attorney, Agent, or Firm*—Nixon & Vanderhye P.C.

(57) ABSTRACT

A voice message is generated having an invariable portion and a variable portion. Most of the invariable portion is provided in the form of recorded speech whereas the variable portion is provided in the form of synthesized speech. The synthesized speech also extends by half a phoneme into the invariable portion of the message. The synthesized speech and the recorded speech are then concatenated, with a transition signal being formed on the basis of a boundary portion of each of the recorded and synthesized signals about any join. In forming the transition signal, a set of transition signal pitchmarks is created and an overlap-add technique is used to copy the waveform within the boundary portions of the speech signals around the transition signal pitchmarks. The signal around the penultimate pitchmark in the leading boundary portion is copied to the trailing half of the transition signal and the signal around the second pitchmark in the trailing boundary portion is copied to the leading half of the transition signal. In this way, the characteristics of the generated message around the join change gradually between the characteristics of the recorded speech and the characteristics of the synthesized speech.

32 Claims, 10 Drawing Sheets

GENERATION OF VOICE MESSAGES

BACKGROUND OF THE INVENTION

1. Field of the Invention

The present invention relates to apparatus for and a method of generating voice messages. It has particular utility in relation to voice message generators which generate one or more types of message, each type of message having an invariable portion which is common to all such messages and a variable portion which normally differs from one such message to the next.

2. Related Art

In many examples of such voice message apparatus it is undesirable to record, in their entirety, all possible messages that might be output by the apparatus. Instead, benefits are gained by storing only one instance of the invariable portion (sometimes known as a carrier phrase) and using that in the generation of all messages of that type. The variable portion of the message giving message-specific information can then be output with the carrier phrase to generate a specific message.

In some cases recorded speech corresponding to each possible message-specific information can be used. In other cases, it is better to synthesise speech corresponding to the message-specific information.

To give an example of the former case, an information apparatus for use in a metropolitan railway network might be operable to output a chosen message for each of around 200 stations in the network. A carrier phrase for one type of message might then be 'This train is now approaching . . . ' Any one of the 200 station names (the message specific information) might be inserted into the gap in generating a specific message. Those skilled in the art will realise that the cost and complexity of the information apparatus will be significantly reduced if a single recording of the carrier phrase is used for all of the 200 possible messages.

To give an example of the latter case, a voice message generator forms an important component in an apparatus operable to enable the telephonic retrieval of information stored in a database. If, say, the database contains the names and telephone numbers of millions of people, it is impractical to store a recording of every one of those names and corresponding numbers. Hence, voice messages output by such apparatuses include variable portions synthesised from a text signal representing the name and/or the number concerned. Again, a single recording of a carrier phrase such as 'The number you require is . . . ' can be used in generating any possible message of that type.

However, a drawback of conventional voice message generators is that the carrier phrase may have characteristic qualities which are different from those of the message specific part. These qualities might include highness of voice, liveliness of intonation, speed of delivery, loudness and the like. This is especially so in messages containing both recorded and synthetic speech, since, owing to the constraints of conventional speech synthesis technology, it is likely that the synthesised voice will have lower pitch and duller intonation than the recorded voice.

Another situation in which such a disturbing change of quality might present a problem arises where a recorded word is inserted to the synthesised output of the text-to-speech apparatus. It might be necessary to do this because the text-to-speech apparatus is itself unable to say the word well.

The conventional solution to the above problems is to place a short pause before and/or after the variable portion of the message.

SUMMARY OF THE INVENTION

According to the present invention there is provided a method of generating a voice message signal representing all or part of a message comprising a variable portion and an invariable portion, said method comprising: obtaining a recorded carrier speech signal representing at least a major part of the invariable portion; obtaining a message-specific speech signal representing at least the variable portion; generating a transition signal on the basis of the carrier and message-specific speech signals; forming the voice message signal by concatenating all or part of one of the carrier speech signal and the message-specific speech signal, said transition signal and all or part of the other of said carrier speech signal and the message-specific speech signal.

Because the carrier and message-specific signals are merged rather than being separated by a pause, the output of an apparatus operating in accordance with the above method is more fluent than has hitherto been achieved.

The word 'signal' is intended in this specification to include electrical, electromagnetic (including optical) or like types of signal.

It is to be understood that the carrier and message-specific signals may derive from the same speaker. For example, the carrier phrase may be obtained directly from a recording of a speaker's voice, whilst the message-specific part is formed from the concatenation of phoneme segment-representing signals taken from a recording of the same speaker's voice. Also, a speaker's voice may vary between recording sessions or even during a recording session.

Preferably, said transition signal generating step involves the generation of a transition signal which represents a transition audio portion whose pitch varies from having an initial pitch similar to the end of the leading one of the carrier speech signal and the message-specific speech signal to having a final pitch similar to the beginning of the trailing one of the carrier speech signal and the message-specific speech signal. This has the advantage that the presence of a disturbing pitch discontinuity in the output voice message is avoided.

Preferably, the method further comprises the step of truncating one or both of the carrier speech signal and the message-specific speech signal to the extent that the total length removed is substantially equal to the length of the transition signal. This has the advantage that the duration of the voice message is not altered by the insertion of the transition audio portion represented by the transition signal.

Preferably, the transition signal generating step comprises: generating a plurality of transition pitchmarks, the spacing of which represents the pitch of a transition audio portion represented by said transition signal; windowing the carrier speech signal to provide carrier speech short-term signals; windowing the message-specific speech signal to provide message-specific speech short-term signals; and mapping the carrier speech short-term signals and the message-specific short-term signals onto said transition pitchmarks to generate the transition signal.

Because this method involves low computation its use leads to a lower cost voice message generator.

In a preferred embodiment the transition pitchmark providing step involves a linear interpolation between values of the pitch of the voice message on either side of the transition audio portion. It is found that the use of a linear interpolation method represents a good compromise between the requirement for low computation and the requirement for a fluent output.

In a further refinement, the mapping comprises mapping a combination of a message-specific speech short-term signal and a carrier speech short-term signal to one or more of said plurality of transition pitchmarks. This has the advantage of providing a smooth change in the timbre of the voice message at the join between the two voice message portions.

Preferably, the transition audio portion is located around the centre of a phoneme of the invariable portion, which phoneme is closest to the boundary between the invariable portion and the variable portion of the voice message. The effect of this is to increase the fluency of the voice message.

According to a second aspect of the present invention there is provided apparatus for generating a voice message signal representing a message comprising a variable portion and an invariable portion, said apparatus comprising:

means arranged in operation to receive a carrier speech signal representing at least a major part of the invariable portion;

means arranged in operation to receive a message-specific speech signal representing at least the variable portion;

means arranged in operation to generate a transition signal on the basis of said carrier and message-specific signals;

means arranged in operation to form said voice message signal by concatenating one of said carrier signal and said message-specific signal, said transition signal and the other of said carrier and said message-specific signal.

BRIEF DESCRIPTION OF THE DRAWINGS

There now follows, by way of example only, a description of a specific embodiment of the present invention. The description is given with reference to the accompanying drawings, in which.

DETAILED DESCRIPTION OF EXEMPLARY EMBODIMENTS

Figure 1:
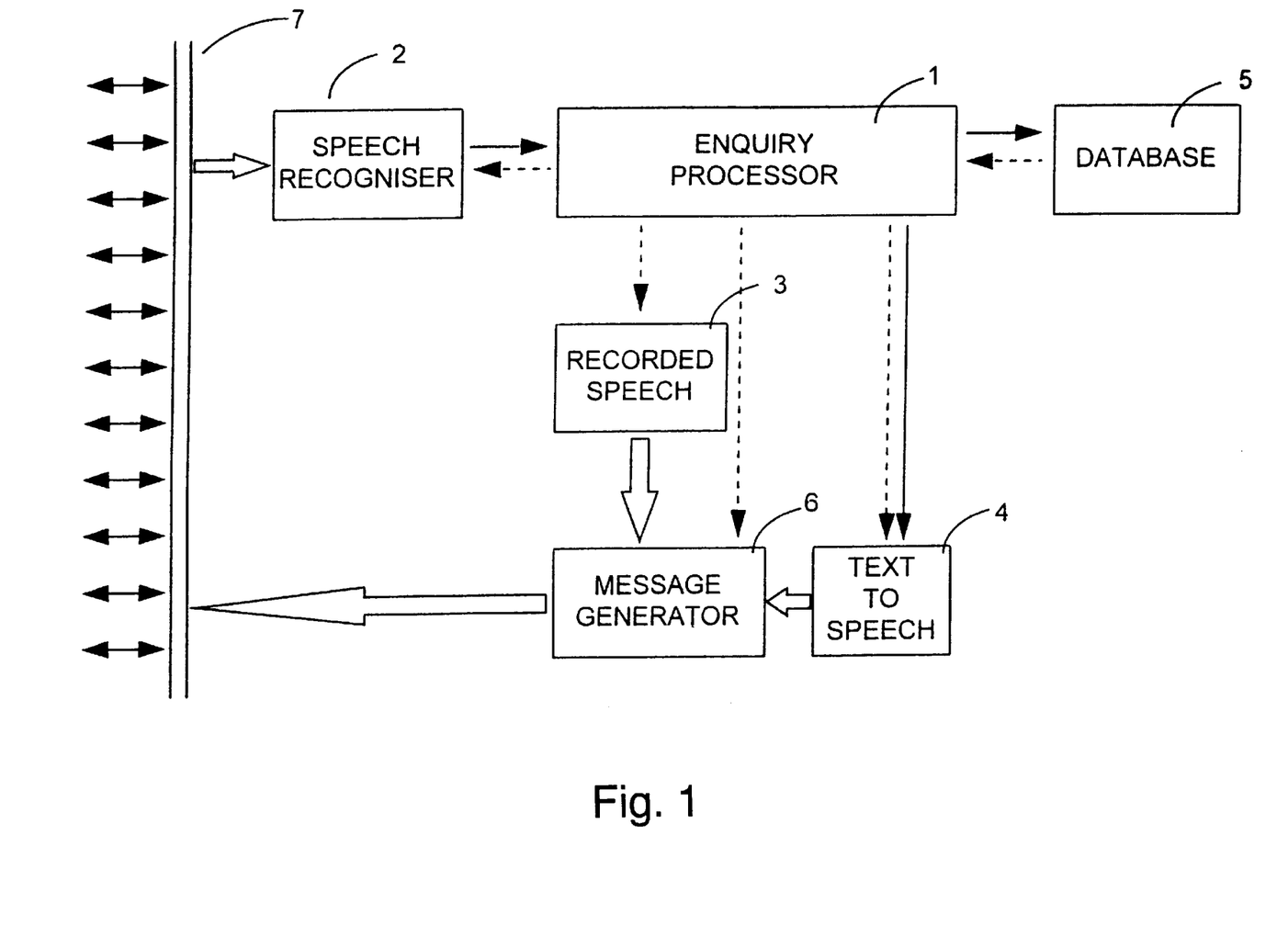
FIG. 1 is a block diagram illustrating the components of an automated database enquiry system incorporating the message generator of the present embodiment.

FIG. 1 illustrates an automated directory enquiry apparatus which may be inserted at any convenient point in a communications network. The apparatus comprises a dedicated computer which itself comprises a central processor 1, which is connected via data and address buses to: a speech recogniser 2; a ROM 3 for storing recordings of phrases commonly used in messages output by the apparatus; a text to speech converter 4 (for example, BT's 'Laureate' text to speech synthesiser) which has a diphone dictionary for use in the conversion; a database 5; and a message generator 6 for merging the outputs of the ROM 3 and the text to speech converter 4. The message generator 6 is provided with random access memory (RAM) in which speech data can be stored. The database 5 may be stored on a CD ROM and includes the names, addresses and telephone numbers of persons who are connected to the network. The message generator 6 is arranged to receive recorded speech signals from the ROM 3 and also synthesised speech signals from the text to speech synthesiser 4. The apparatus includes an interface 7 to the telephone network. The speech recogniser 2 is arranged to receive speech from a telephone line in the network via the interface 7 and the message generator 6 is arranged to transmit speech signals via the interface 7 along the same telephone line.

In use, a person wishing to know the telephone number of another person on the network dials a predetermined number and gives the name and address of the person whose number they are seeking in response to questions output by the apparatus. The apparatus then produces further messages asking the enquirer to confirm that it has correctly recognised the name and address given by the enquirer. Once this has been confirmed, the name and address is forwarded to the database which then returns the required number. Thereafter, a message is generated by the apparatus which informs the enquirer of that number.

Some of the problems encountered in developing an automated directory enquiries apparatus can be illustrated by considering an example of a message which might be output by the apparatus, that message being: "Is the name David Bailey?". It will be appreciated that the apparatus might be required to provide such a message in order to confirm that the name spoken by the enquirer has been correctly recognised. Clearly, the invariable portion of this message consists of the words "Is the name" and the variable portion of this message consists of the name "David Bailey". Again, because such a large number of names are stored in the system, it is not practical to have a recorded version of each one.

In practice, it is found that the change in the characteristic qualities of the voice between the end of the word "name" and the beginning of the word "David" is disturbing.

As is known in relation to a known directory enquiries system, one solution to the problem is to record the invariable portion on its own and then to insert a pause between the invariable portion of the message and the variable portion. However, this solution is not favoured because the pause has a significant detrimental effect on the fluency of the message.

Returning now to the operation of the automated directory enquiries apparatus, in generating a message having a variable portion and an invariable portion, the enquiry processor 1 first sends the text of an entire sentence of the message to the text to speech synthesiser 4. The text to speech synthesiser 4 then converts the text into a series of diphones and concatenates waveforms representing each of these diphones together in order to form a synthesised speech signal which corresponds to the text of the sentence. The text to speech synthesiser 4 also provides annotation data which indicates the occurrences of phoneme boundaries within the synthesised speech signal.

The text to speech synthesiser 4 also provides data representing the location of 'pitchmarks' within the synthesised speech signal. As is known by those skilled in the art, in voiced speech, in which the glottis is rapidly opened and closed, the pitch of speech can be represented by pitchmarks which occur at a given point within a cycle of the speech waveform. A convenient point to choose is the point at which the glottis closes as this can be established from laryngograph measurements. In setting up the automated directory enquiries apparatus these measurements are made and the resulting pitchmarks are stored both with the digital data representing the diphone waveforms used in the text to speech synthesiser 4 and with the digital data representing recorded messages stored in the ROM 3. For those parts of the speech signal which represent unvoiced speech, pitchmarks are placed at regular intervals. The digital data stored in the ROM 3 also includes annotation data which indicates the occurrences of phoneme boundaries within the synthesised speech signal.

The reason that an entire sentence of the message is synthesised is to ensure that the intonation of the concatenated message is as natural as possible. Using the above message as an example, if the question "Is the name David Bailey?" is input to the text to speech synthesiser 4 then the synthesiser 4 synthesises the words "David Bailey" and provides them with a rising pitch towards the end of the word "Bailey". If, however, only the text "David Bailey" was synthesised by the text to speech synthesiser 4, then the pitch would drop towards the end of the word "Bailey". If the name "David Bailey" were then to be concatenated with the remainder of the message then the resulting intonation would be unnatural in that it would not indicate to the listener that a question was being asked.

Once the synthesised speech signal has been created, the message generator 6 selects a portion of the synthesised speech signal which represents the variable portion of the message and, in addition, half of the neighbouring phoneme in any adjoining invariable portion of the message. Thereafter, the message generator 6 selects a section of the recorded speech signal which represents the invariable portion of the message less half of any phoneme which neighbours the invariable portion. The two portions of the message selected in this way are then concatenated to form the required message. It will be realised that the point at which the two portions of the messages are joined will lie at the centre of a phoneme.

Figure 2:
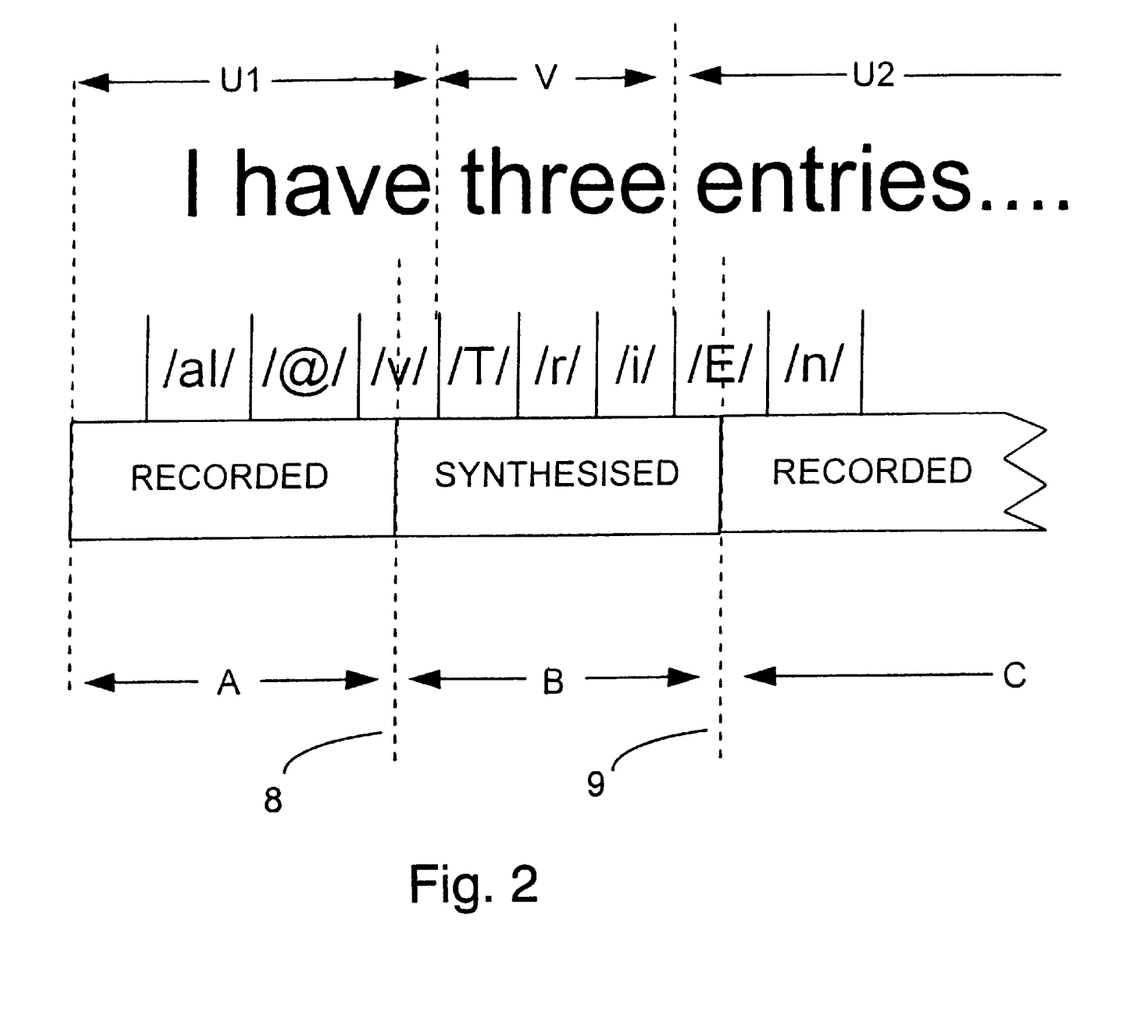
FIG. 2 illustrates the location of the joins between the synthesised and recorded portions of one message which might be output by the message generator.

By way of example, in relation to the automated directory enquiry apparatus described above, if the name and address details given by the enquirer do not specify a single entry within the database, then the apparatus will generate a message such as "I have three entries for that name" (FIG. 2). It will be realised that the variable portion V of this message is the number, in this case "three". The portion U1 "I have" is invariable as is the portion U2 "entries for that name". As the invariable portions U1, U2 of the message are often used, and in order to make the recording sound as natural as possible, a message such as "I have seven entries for that name" is stored in the ROM 3.

Figure 3:
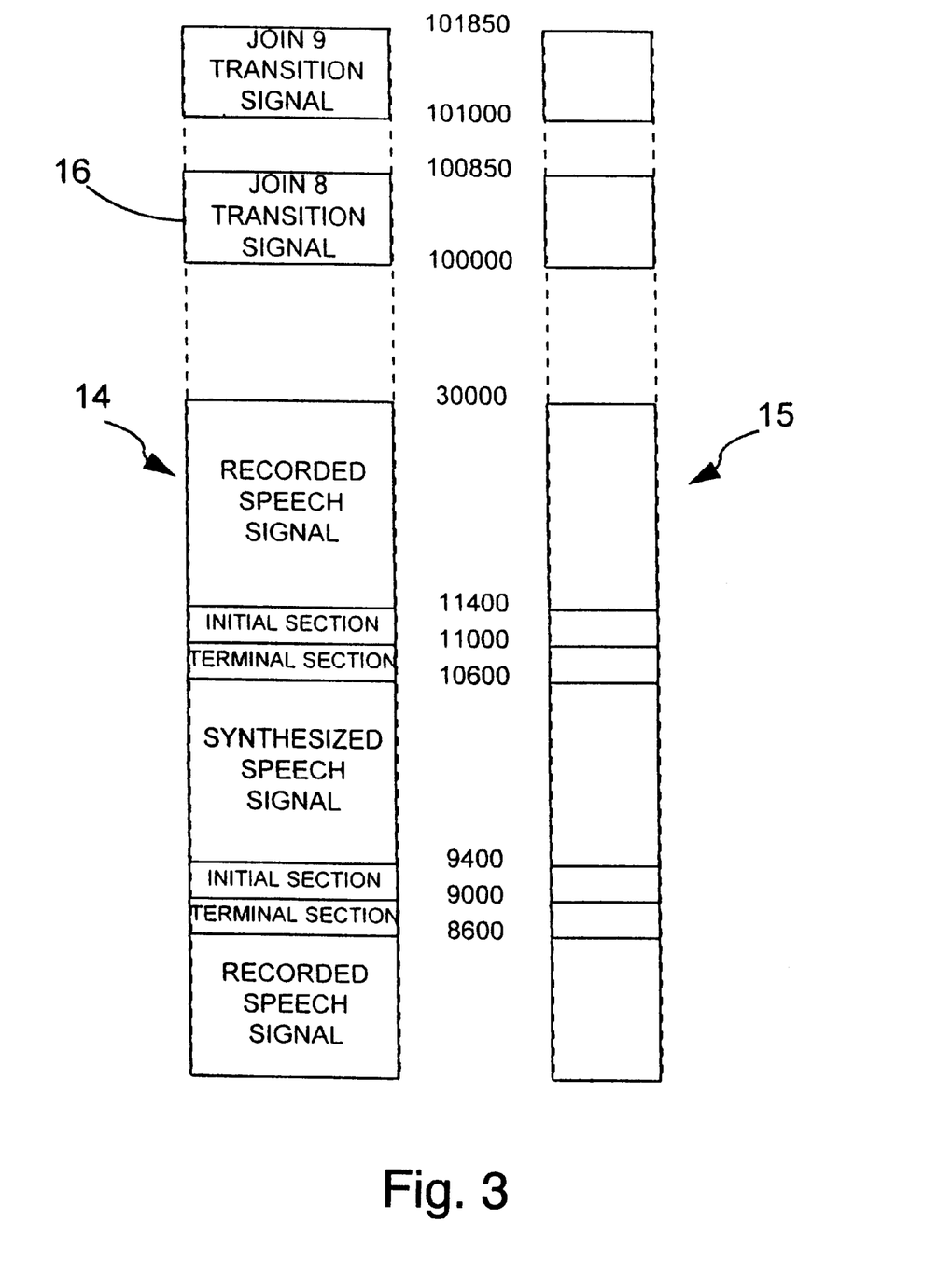
FIG. 3 shows the structure of two data files set up within the RAM of the message generator 6.

Referring to FIG. 2, in generating the message, the enquiry processor 1 sends the text "I have three entries for that name" to the text to speech synthesiser 4 and controls it to synthesise the text as a digitised waveform. Thereafter, the enquiry processor 1 instructs the recorded speech unit 3 to send the recorded speech signal A, which ends at the middle of the phoneme (/v/) preceding the word "seven", to the message generator 6. Referring to FIG. 3, this part of the message is stored in a speech signal data file 14 created in the RAM of the message generator 6 and might, for example, occupy fields 0 to 9000 of that file. The enquiry processor 1 then selects a portion (B: FIG. 2) of the synthesised speech signal which extends from the middle of the phoneme (/v/) preceding the word "three" to the mid point of the first phoneme (/E/) after the word "three". The digital data representing this portion B of the message might be, say, 2000 bytes long and would then be loaded into the fields 9001 to 11000 of the speech signal data file 14. Thereafter, the enquiry processor 1 instructs the recorded speech unit 3 to send to the message generator 6 the recorded speech signal C representing the second portion U2 of the recorded message, the speech signal C extending from the mid point of the first phoneme (/E/) after the word "seven" to the end of the message. Assuming this part of the message to be 19000 bytes long, the digital data making up the recorded speech signal C is loaded into the fields 11001 to 30000 of the speech signal data file 14.

At the same time that the above operations take place, data indicating the position of pitchmarks within the speech signals A,B,C is passed to a pitchmark data file 15 located elsewhere in the RAM of the message generator 6.

The message generator might then output the formed message by simply passing the speech signal data file 14 to the telephone line of the enquirer. However, this would result in the quality of the message output by the apparatus being poor.

Hence, the message generator 6 blends the signals at any join 8,9 between synthesised speech B and recorded speech A,C in a way which will be described in detail below.

Figure 4A:
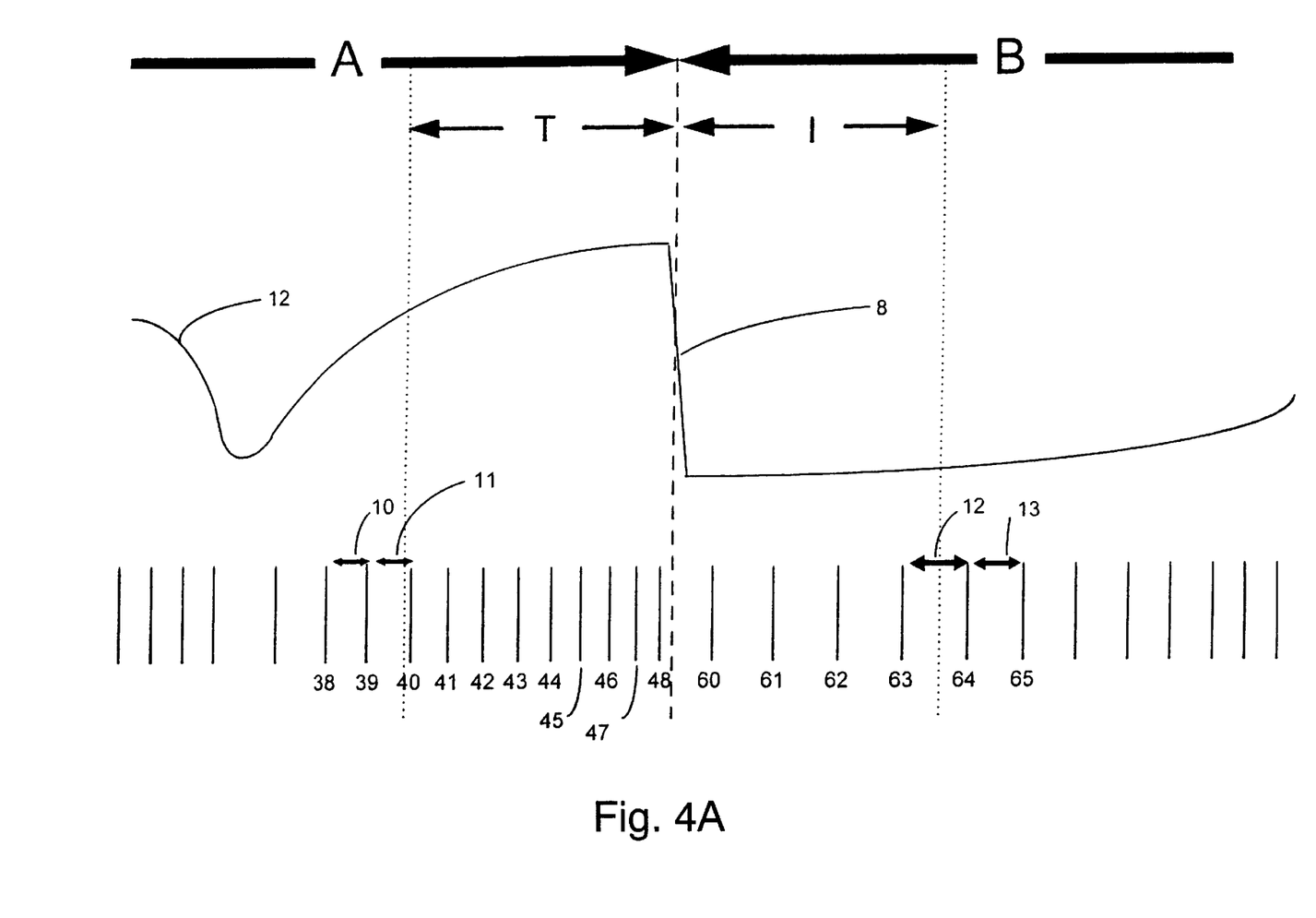
FIG. 4A illustrates the pitchmarks corresponding to the abutting voice message portions to be merged.

FIG. 4A illustrates a discontinuity in pitch which marks the location of the join 8 between the leading recorded speech signal A and the trailing synthesised speech signal B. Some discontinuity in the characteristic qualities of the voice occurs even if the same speaker provides the recorded speech stored in ROM 3 and the diphone waveforms for the text to speech synthesiser 4. This is because many conventional speech synthesisers cannot provide intonation as lively as that of natural speech. It will be seen that the spacing between the pitchmarks is relatively close in the terminal section T of the recorded speech signal A and then changes abruptly at the join 8 to a relatively wide spacing in the initial section I of the synthesised speech signal B. Also shown in FIG. 4A is a pitch contour 20 which represents the pitch of the speech signals. The sudden fall in pitch at the join 8 would result in a disturbing discontinuity if the recorded speech A and synthesised speech B were output in a merely concatenated form as shown.

Returning to FIG. 3, in blending the recorded speech A into the synthesised speech B, a transition signal is created which is stored in the RAM of the message generator 6. The transition signal data is stored from, say, field 100,000 of the speech signal data file 14. Corresponding pitchmark data is created at a corresponding location in the pitchmark data file 15. To create the transition signal pitchmark data, the enquiry processor 1 first defines both the terminal section T of the recorded speech signal A and the initial section I of the synthesised speech signal B to have a 50 millisecond duration. Given that both the recorded speech A and synthesised speech B result from sampling speech at 8 kHz and each signal sample is represented by a byte of data, each section T,I will be represented by 400 bytes. The terminal section T extends from field 8601 to field 9000 of the speech signal data file 14 and the initial section I extends from field 9001 to 9400. Thereafter, the pitch of the recorded speech signal A at the beginning of the terminal section T is found by reading the pitchmark data file 15 around that location and calculating the duration of the pitch period 11 (FIG. 4A) which surrounds the beginning of the terminal section T and also that of the previous pitch period 10. The pitch of the recorded speech A is then calculated by taking the reciprocal of the calculated pitch periods. The two pitches are then averaged to give a value for the pitch of the recorded speech A at the beginning of the terminal section T. If it is found that the pitch calculated on the basis of one of the pitch periods differs from that calculated on the basis of the other pitch period by more than 20 ms then adjacent pitch periods are used in calculating the pitch.

Figure 4B:
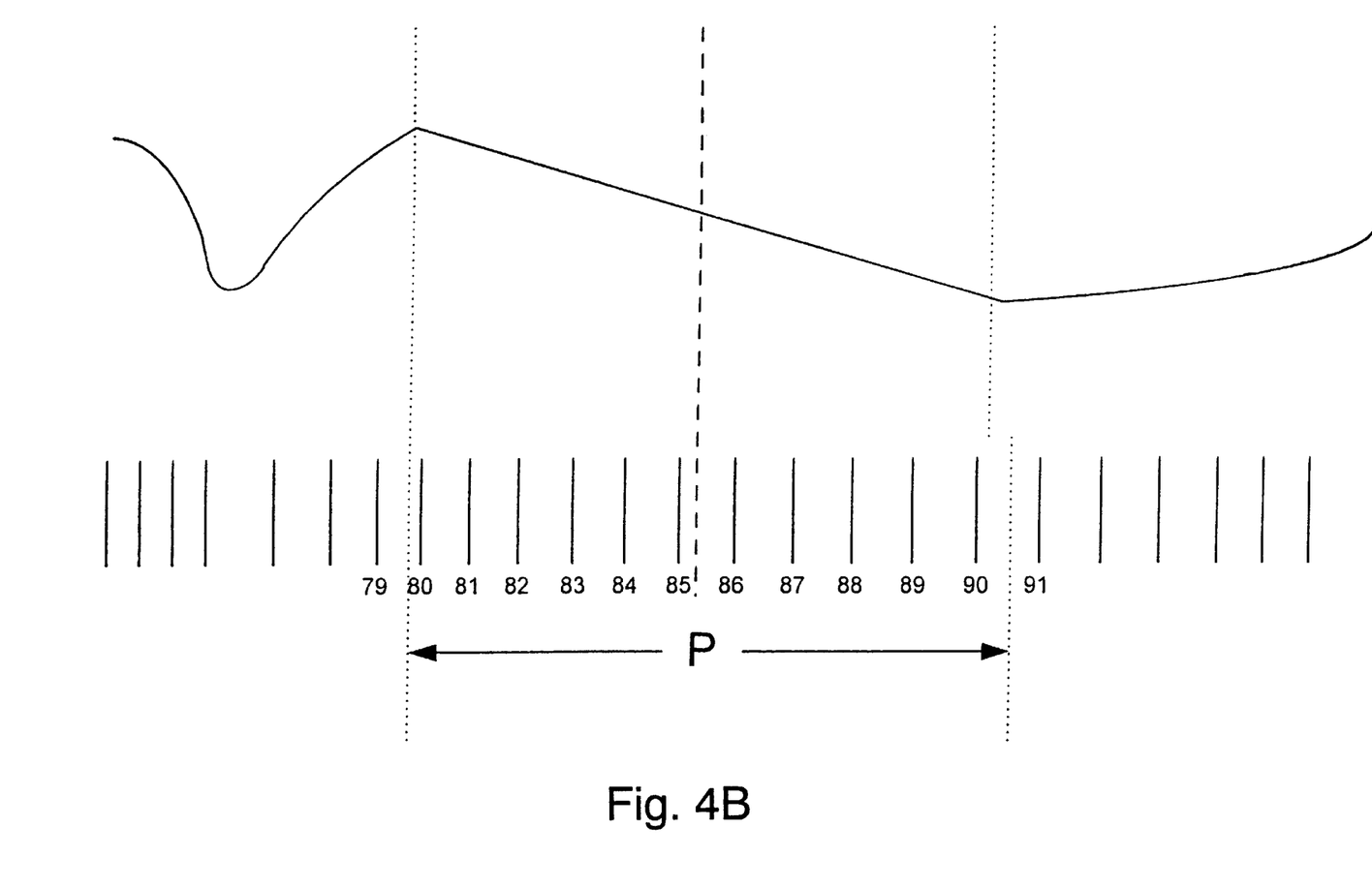
FIG. 4B illustrates the pitchmarks generated for the transition signal.

A similar calculation is then carried out to find the pitch of the synthesised speech B at the end of the initial section I, the calculation being based on the pitch period 12 which surrounds the end of the initial section and the subsequent pitch period 13. Once that has been done, a set P of transition signal pitchmarks is calculated such that the spacing between the transition signal pitchmarks steadily increases or decreases from the initial pitch period to the final pitch period (FIG. 4B). In the present example the duration of the transition signal data is slightly greater than the combined lengths of the terminal section T and the initial section I. The transition signal pitchmark data P might therefore occupy fields 100000 to 100850 of the pitchmark data file 15.

Once a set of transition signal pitchmarks P has been created as described above, the characteristics of the waveform within the terminal section T of the recorded speech signal A and the initial section I of the synthesised speech signal B are added into the transition signal data file 14. The way in which the transition signal is derived is described below in relation to FIGS. 5A, 5B, 5C and 6.

The first operation in the generation of the transition signal is to select for each of the leading transition signal pitchmarks 80–85 the most closely corresponding terminal section pitchmark 40, 41, 43, 44, 47—ignoring the last leading signal pitchmark 48. The correspondence is shown by the solid arrows in FIG. 5A. Once this has been done, a short-term signal is obtained for each selected signal by windowing the leading signal around the appropriate terminal section pitchmark, the short-term signal thus obtained thereafter being multiplied by a smoothing function S before being added into the transition signal data file 16 located between fields 100,000 and 100,850 of the speech signal data file 14.

Figure 5A:
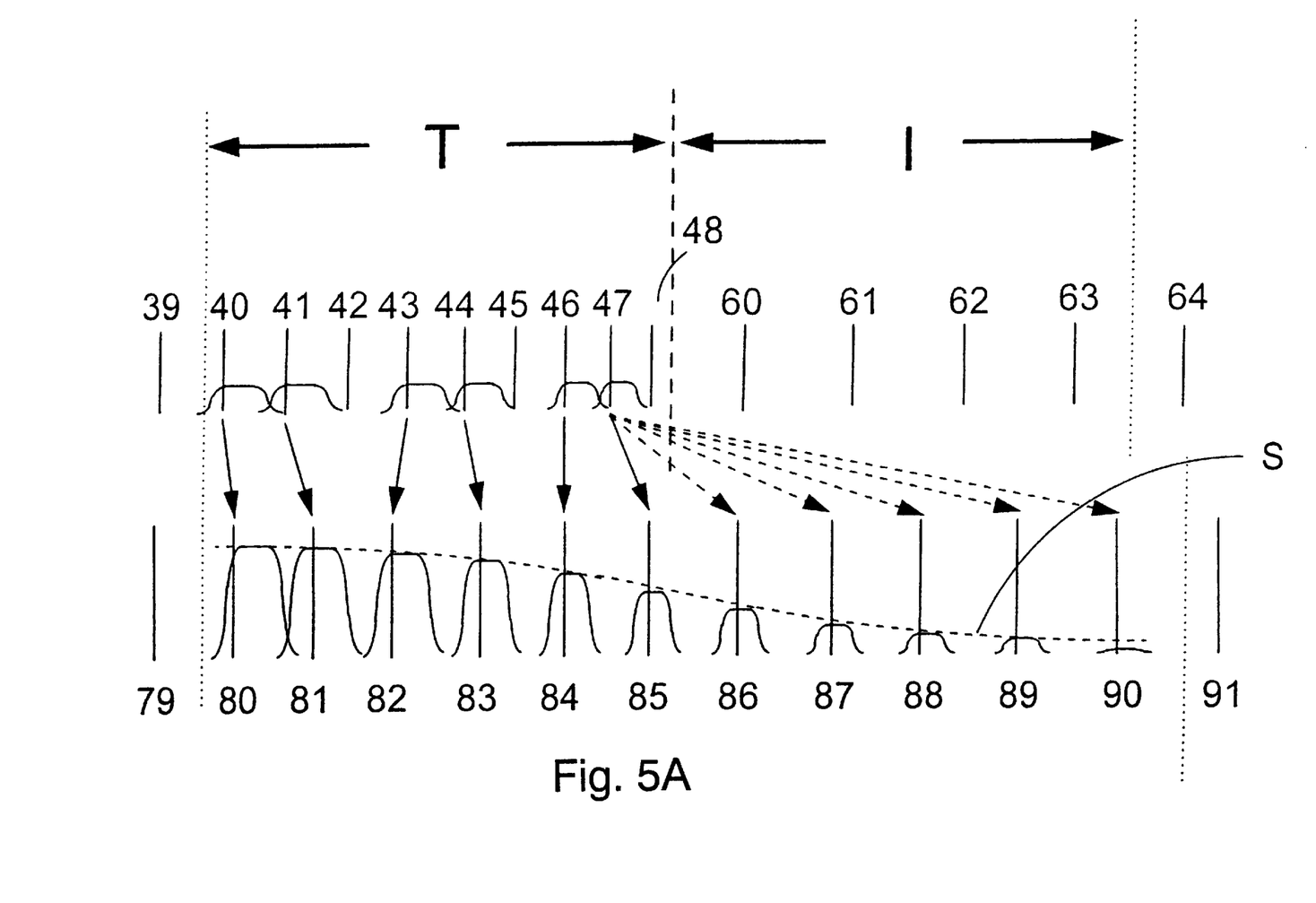
FIG. 5A shows how the short-term signals derived from the leading signal are mapped to the transition signal pitchmarks.

In more detail, for the first of the transition signal pitchmarks 80, the most closely corresponding leading signal pitchmark is selected to be the first terminal section pitchmark 40.

Figure 6:
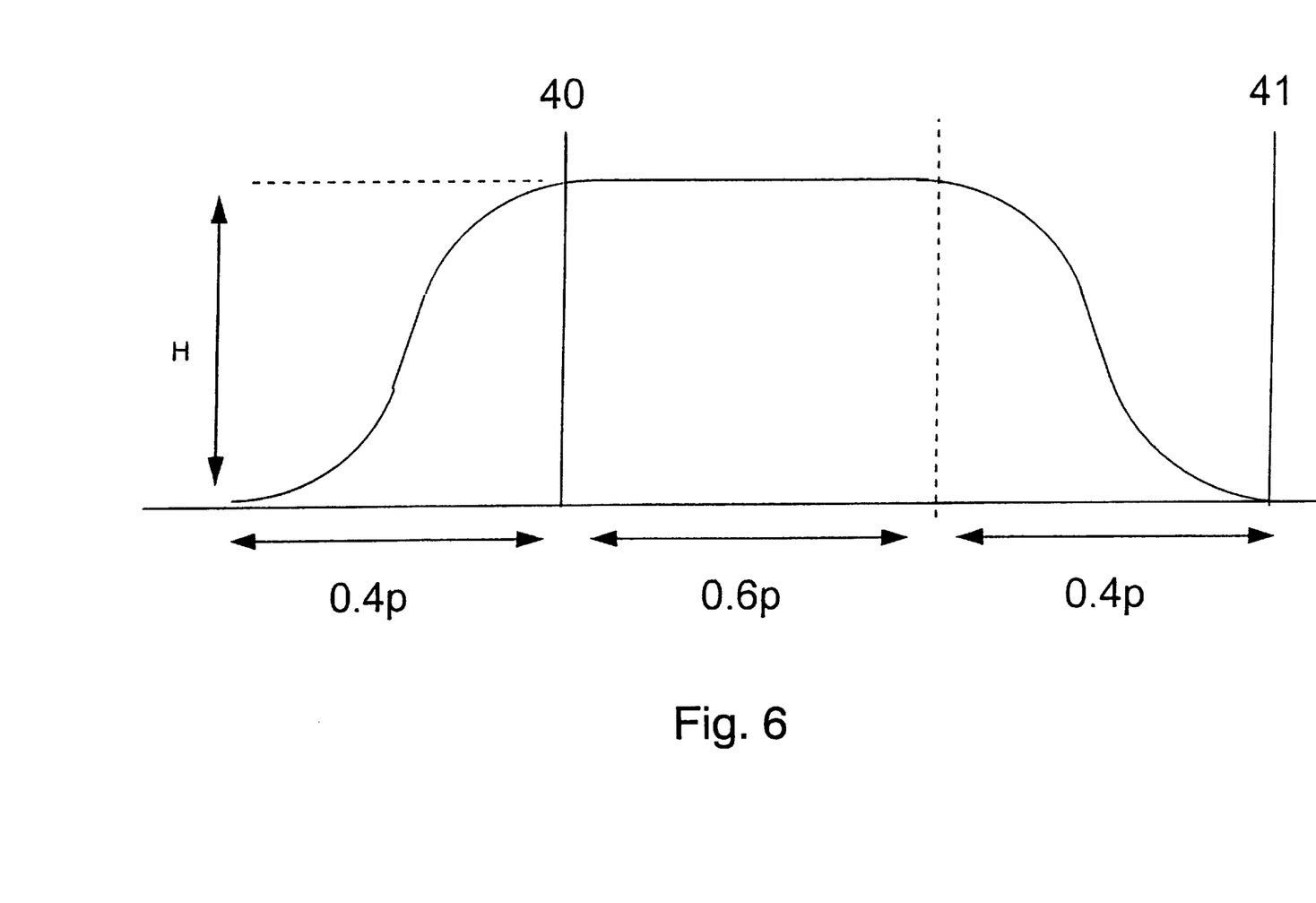
FIG. 6 illustrates the window used in obtaining the short-term signals.

In order to determine the duration of the window function to be used, the length of each of the pitch periods surrounding the first terminal section pitchmark 40 and also each of the pitch periods surrounding the first leading transition signal pitchmark 80 is calculated, the duration of the window then being set to 1.4 times the duration of the shortest of the above pitch periods. In relation to the leading transition signal pitchmark 80, it will be seen that the shortest pitch period is that lying between the first terminal section pitchmark 40 and the second terminal section pitchmark 41. The shape of the resultant window function is shown in FIG. 6.

The window has three sections, the first being a rising section which corresponds to the first half of a Hanning window of height H and a duration equal to 0.8 times the selected pitch period. In other words, the duration of the rising section is equal to 0.4 pitch periods.

The section following the rising section is a section over which the windowing function has a constant value equal to the height H of the rising section. The duration of this constant value section is 0.6 times the duration of the pitch period selected.

The final section of the window has the shape of the falling half of a Hanning window of height H and duration 0.8 pitch periods. It will be realised that the duration of the final section is therefore 0.4 pitch periods.

The centre of the windowing function is offset from the pitchmark such that the rising section and the constant section lie on either side of that pitchmark 40.

It will be appreciated that in the particular case shown, because the duration-determining period is that lying between the first terminal section pitchmark 40 and the second terminal section pitchmark 41, the end of the falling section of the window is coincident with the second terminal section pitchmark 41.

Each of the samples of the leading signal which fall within the window are then multiplied by the window function to obtain a short-term signal.

Once this short-term signal (which is constituted by a set of samples) is obtained, the samples are further multiplied by a smoothing function S. This smoothing function S has a duration equal to the duration of the transition signal and comprises the falling half of a Hanning window of unit height and duration equal to twice the duration of the transition signal.

Once the short-term signal sample values have been multiplied by the smoothing function they are added to the appropriate fields in the transition signal data file 16.

Similar windowing, smoothing and addition processes are carried out in relation to each one of the other selected terminal section pitchmarks 40, 41, 43, 44, 40, 47, the sample values being added where the samples derived from different short-term signals overlap.

In addition, in order to import a measure of the characteristic qualities of the leading signal into the trailing half of the transition signal, the short-term signal derived from the penultimate terminal section pitchmark 47 is, for each of the remaining transition signal pitchmarks 86–90, smoothed and added to the transition signal data file 16.

Figure 5B:
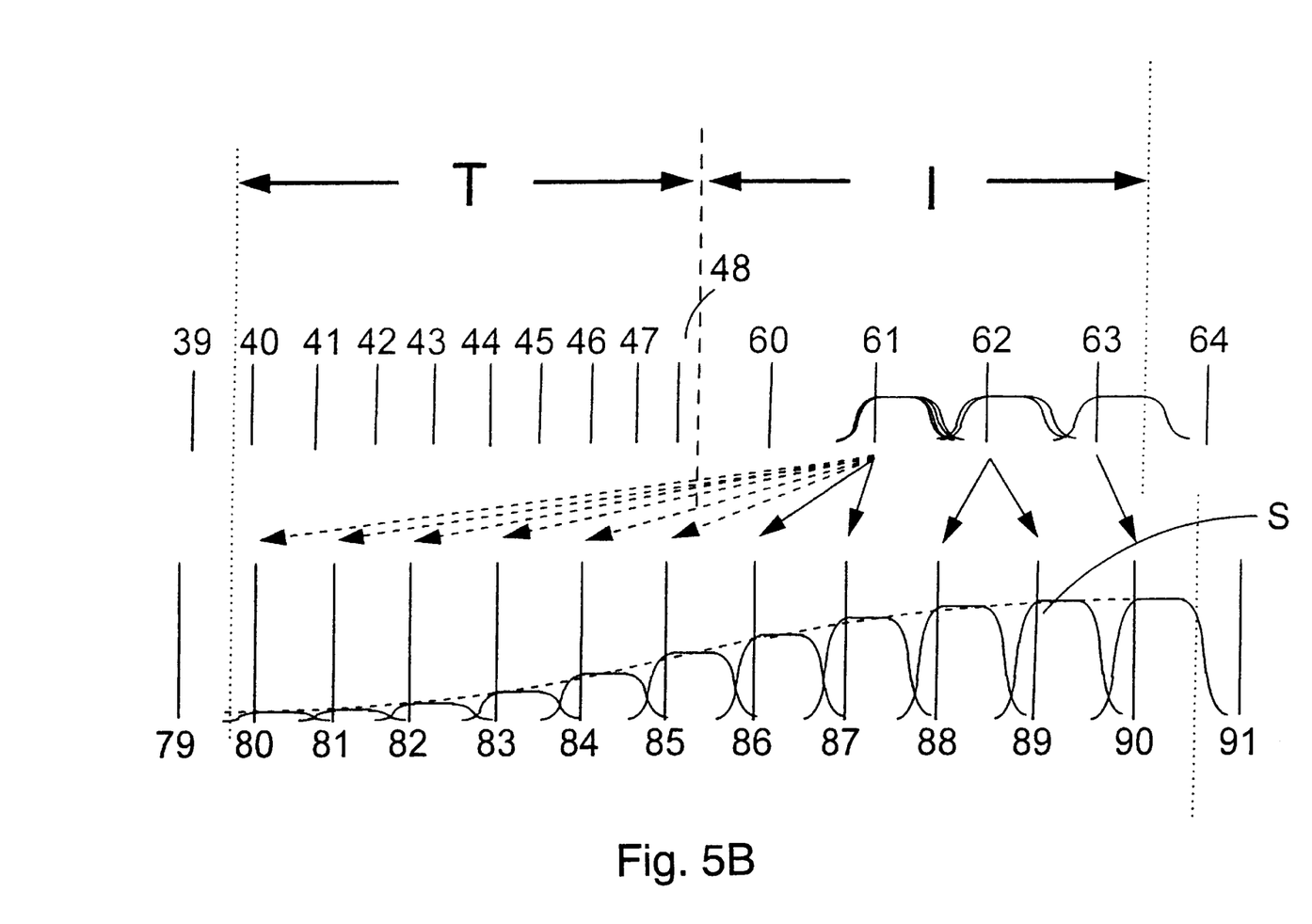
FIG. 5B shows how the short-term signals derived from the trailing signal are mapped to the transition signal pitchmarks.

Then, as shown in FIG. 5B, for each of the transition signal pitchmarks 86–90 in the trailing half of the transition signal, the most closely corresponding initial section pitchmark 61, 62, 63 is selected. The first initial section pitchmark 60 is left out of account in this process. Thereafter, short-term signals are derived for each one of the trailing transition signal pitchmarks 86–90 in a similar way to the derivation of the short-term signals for the leading transition signal pitchmarks 80–85. However, the smoothing function used S' rises from a zero value at the beginning of the transition signal duration to a unit value at the end of the transition signal duration. Analogously to the smoothing function S used in relation to the leading signal pitchmarks 80–85, the smoothing function is the rising half of a Hanning window of a duration equal to twice the duration of the transition signal.

As before, each of the short-term signals is multiplied by the smoothing function S' before being added into the transition signal data file 16.

The signal obtained in relation to the second of the initial section pitchmarks 61 is, for each of the transition signal pitchmarks 80–85 in the leading half of the transition signal, smoothed and then added to the transition signal data file 16.

Figure 5C:
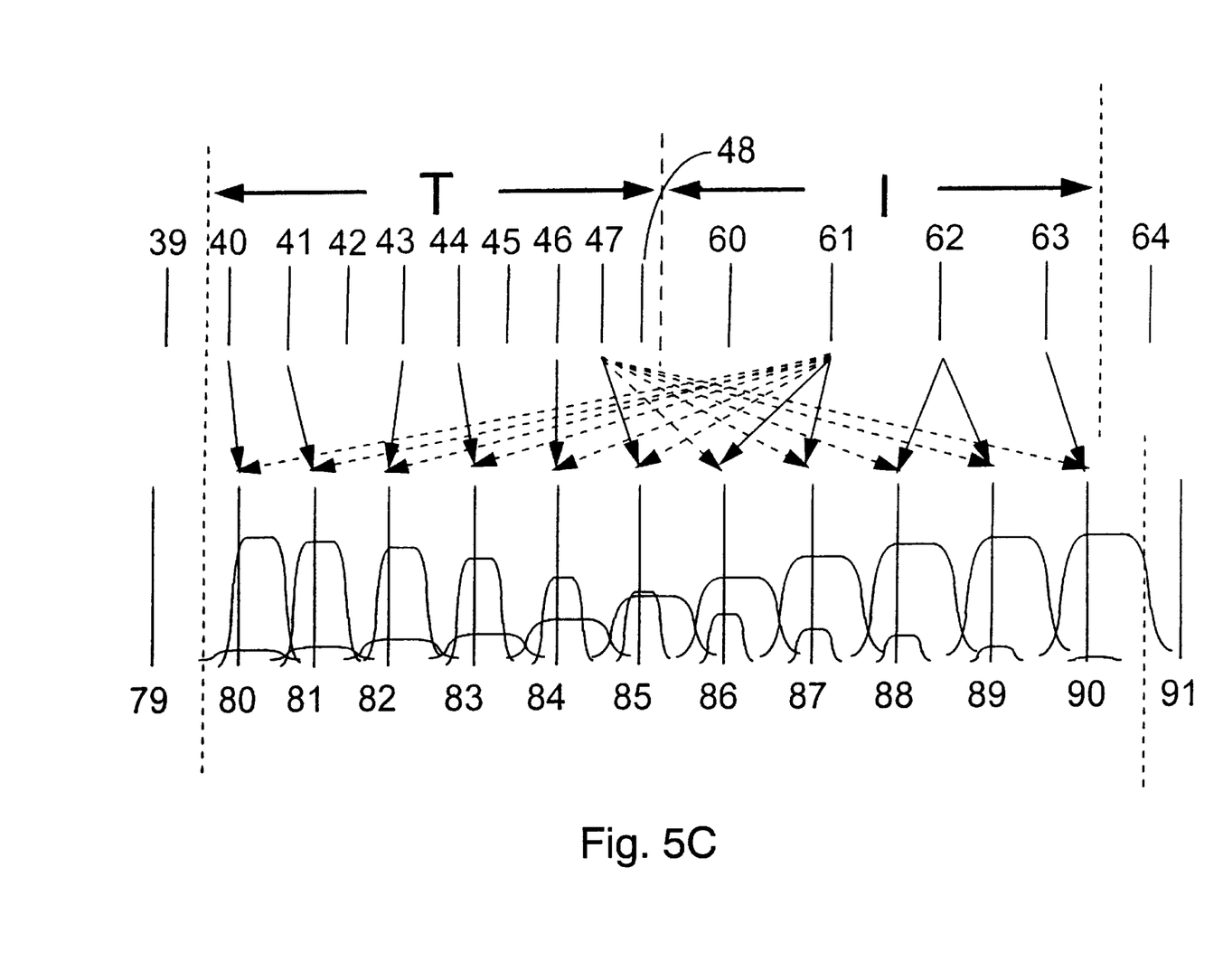
FIG. 5C illustrates the combination of the processes of FIGS. 5A and 5B.

The net additions to the transition signal data file 16 are illustrated in FIG. 5C. It will be realised that the effect of the two smoothing functions S, S' is that the initial characteristics of the transition signal largely equate to the characteristics of the signal derived from around the first terminal section pitchmark 40, the effect of the leading signal characteristics thereafter decreasing until the signal about the last of the leading transition signal pitchmarks 85 is formed by an approximately equal combination of the short-term signals derived from the penultimate trailing section pitchmark 47 and the second initial section pitchmark 61, the influence of the leading signal thereafter decreasing further until the terminal part of the transition signal around the final transition signal pitchmark 90 largely has the characteristic qualities of the trailing signal.

It will be appreciated that the above operations will have filled fields 100000 to 100850 of the transition signal data file 16 with data. In generating the message illustrated in FIG. 2, a further transition signal will be created in relation to the second join 9. This might, for example, occupy fields 101000 to 101850 in the speech signal data file 14. The complete message is then generated by outputting fields 0 to 8600, 100000 to 100850, 9401 to 10600, 101000 to 101850, 11401 to 30000 of the speech signal data file in sequence.

Figure 7:
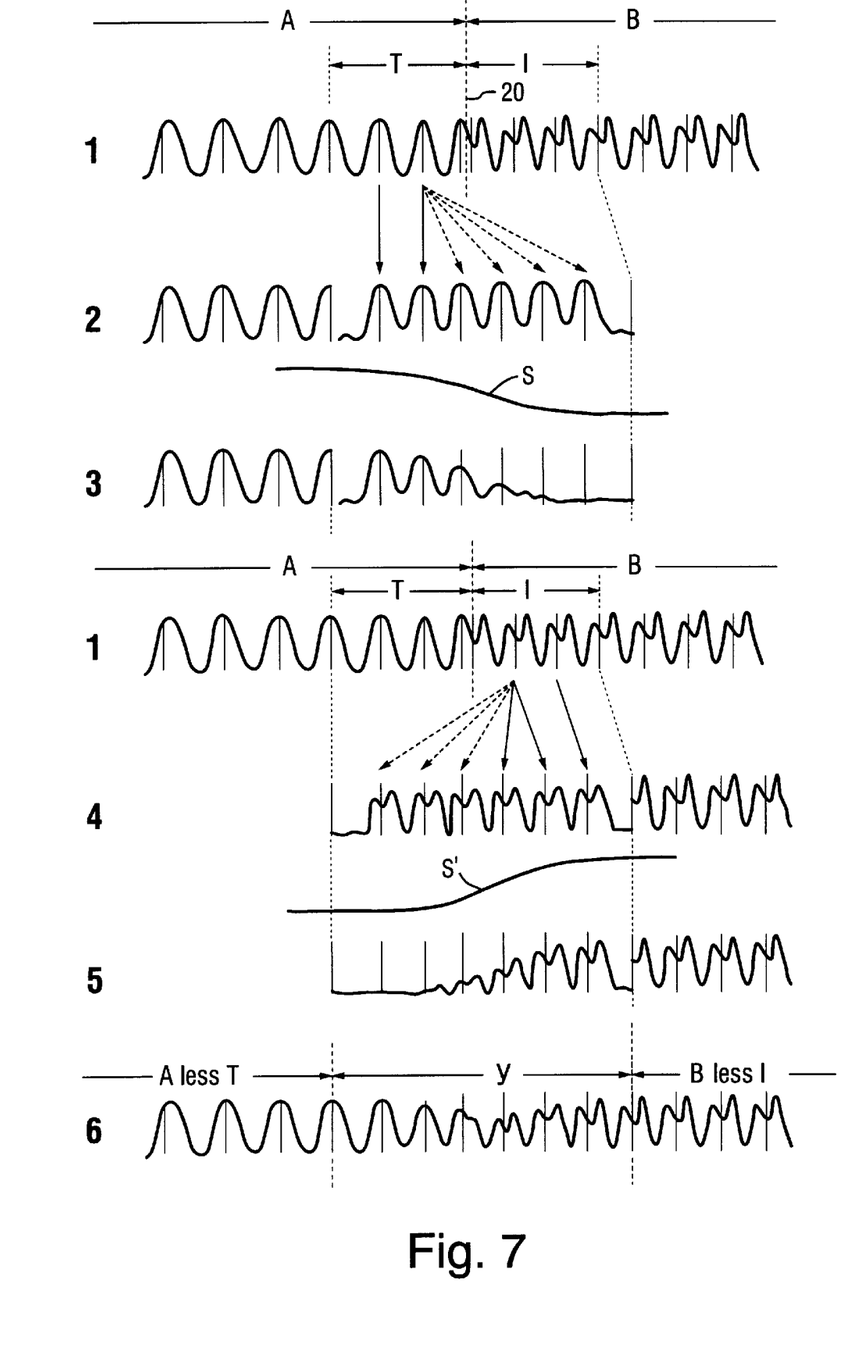
FIG. 7 schematically illustrates the effect of the method carried out by the present embodiment.

The effect of the method of the present embodiment can be seen in relation to FIG. 7. A schematic illustration of the waveform formed by the straightforward concatenation of the recorded A and synthesised B speech signals is shown at Line 1 and can be seen to have a sudden change in its characteristics at a join 20. If a message comprising the signals were output in this form, the join 20 between the recorded A and synthesised B speech signals would be very noticeable and the quality of the message would be impaired.

As explained in detail above, according to the present embodiment, a transition signal Y is created by first forming a set of pitchmarks for the transition signal, then windowing the terminal section of the leading signal to obtain leading signal short-term signals, thereafter multiplying those signals by the smoothing window S and adding samples constituting the resultant product to the transition signal data file 16 (Line 3).

Thereafter, an analogous process using an oppositely biased smoothing function S' is carried out on the trailing signal to add further values to the transition signal data file 16. (Lines 4 and 5).

The transition signal Y thus formed in the transition signal data file 16 then, as illustrated in Line 6, has characteristics which vary smoothly from those of the leading signal to those of the trailing signal.

The voice message to be output would be generated by concatenating the recorded speech signal A less the terminal section T, the transition signal Y, and the synthesised speech signal B less the initial section I, to form a message signal for subsequent conversion to the voice message.

It can be seen that the abrupt change in the characteristics, including timbre, of the voice message is avoided. It can also be seen from the above example how the apparatus of the present embodiment outputs a voice message which sounds more natural to the listener than voice messages output by known message generators.

In the above description, when generating a signal representing a sentence using both recorded and synthesised speech, a synthesised signal representing the entire sentence is generated before selecting a portion of that signal for use in generating the complete sentence. The selected portion is chosen so that it overlaps the recorded signal by one phoneme. This is preferred rather than essential however, and only the parts of the sentence which are not represented by a recorded signal may be synthesised. In this case, although the recorded and synthesised signals merely abut one another, the techniques described above in relation to FIGS. 4A to 7 can still be applied to provide an improved join between the recorded and synthesised speech. The step of truncating both the leading and trailing signals is, of course, no longer necessary.

In the above described embodiment a voice message signal representing part of a voice message including an invariable portion (U1) and a variable portion (V) is generated. The generation includes:

the obtaining of a recorded speech signal (A) which represents all but the last half-phoneme of an invariable portion (U1) of the message;

the obtaining of a synthetic speech signal (B) which represents the variable portion of the message and the two half-phonemes immediately on either side;

the generation of a transition signal (16) on the basis of the recorded speech signal (A) and synthetic speech signal (B); and after the truncation of the recorded speech signal (A) and the synthetic speech signal (B), the formation of the voice message signal by the concatenation of the truncated recorded speech signal (bytes 0 to 8600 in FIG. 3), the transition signal (bytes 100000 to 100850), and the doubly truncated synthetic speech signal (bytes 9400 to 10600).

Were the message to consist only of the words 'I have three' then the synthetic speech signal would only be truncated at its beginning and the voice message signal would represent all of the voice message.

It is possible that the terminal and initial sections could be retained in the generated voice message signal, the duration of the output message therefore being lengthened by the duration of the audio transition portion. The concatenation would then involve all of the recorded speech signal and all of the synthetic speech signal.

It will be realised that were the above described telephone number enquiry service to be limited to less than, say, one hundred people, then a recorded version of each person's name could be used instead of employing a text-to-speech synthesiser.

What is claimed is:

1. A method of generating a voice message signal representing all or part of a message comprising a variable portion and an invariable portion, said method comprising:

obtaining a recorded carrier speech signal representing at least a major part of the invariable portion;

obtaining a message-specific speech signal representing at least the variable portion;

generating a transition signal on the basis of the carrier and message-specific speech signals;

forming the voice message signal by concatenating all or part of one of the carrier speech signal and the message-specific speech signal, said transition signal and all or part of the other of said carrier speech signal and the message-specific speech signal.

2. A method according to claim 1, further comprising the step of truncating one or both of the carrier speech signal and the message-specific speech signal to the extent that the total length removed is substantially equal to the length of the transition signal.

3. A method according to claim 1 wherein said transition signal generating step involves the generation of a transition signal which represents a transition audio portion whose pitch varies from having an initial pitch similar to the end of the leading one of said carrier speech signal and said message-specific speech signal to having a final pitch similar to the beginning of the trailing one of the carrier speech signal and the message-specific speech signal.

4. A method according to claim 1 wherein said transition signal generating step comprises:
generating a plurality of transition pitchmarks, the spacing of which represents the pitch of a transition audio portion represented by said transition signal;
windowing the carrier speech signal to provide carrier speech short-term signals;
windowing the message-specific speech signal to provide message-specific speech short-term signals; and
mapping the carrier speech short-term signals and the message-specific short-term signals onto said transition pitchmarks to generate the transition signal.

5. A method according to claim 4 wherein said transition pitchmark providing step involves a linear interpolation between the pitch of the voice message on either side of the transition audio portion.

6. A method according to claim 4 wherein said mapping comprises mapping a combination of a carrier speech short-term signal and a message-specific speech short-term signal to one or more of said plurality of transition pitchmarks.

7. A method according to claim 1 wherein the transition audio portion is located around the centre of a phoneme of the invariable portion, which phoneme is closest to the boundary between the invariable portion and the variable portion of the voice message.

8. A method of generating a voice message-representing signal from a text-representing signal, said method comprising:
obtaining a leading signal corresponding to a leading portion of said text-representing signal;
obtaining a trailing signal corresponding to a trailing portion of said text-representing signal;
wherein:
said leading signal represents a first voice and said trailing signal represents a second voice, said first voice and said second voice each including one of a variable speech signal and an invariable speech signal which are discernibly differing in respect of at least one quality;
at least a major portion of said leading signal represents a first voice message portion; and
at least a major portion of said trailing signal represents a second voice message portion;
said method further comprising the steps of:
generating, on the basis of said leading signal and said trailing signal, a transition signal representing a transition audio portion, which audio portion varies from having an initial pitch similar to that of the end of said first voice message portion to having a final pitch similar to that of the beginning of the second voice message portion; and
concatenating said at least major portion of said leading signal, said transition signal and said at least major portion of said trailing signal in providing said voice message-representing signal.

9. Apparatus for generating a voice message signal representing a message comprising a variable portion and an invariable portion, said apparatus comprising:
means arranged in operation to receive a carrier speech signal representing at least a major part of the invariable portion;
means arranged in operation to receive a message-specific speech signal representing at least the variable portion;
means arranged in operation to generate a transition signal on the basis of said carrier and message-specific signals;
means arranged in operation to form said voice message signal by concatenating one of said carrier signal and said message-specific signal, said transition signal and the other of said carrier and said message-specific signal.

10. A text to speech conversion apparatus including a voice message signal generator according to claim 9.

11. A voice operated database enquiry apparatus including a text to speech conversion apparatus according to claim 10.

12. Apparatus for generating voice message data representing a voice message having a variable portion and an invariable portion, said apparatus including:
a storage medium having recorded therein processor readable code processable to generate said voice message data, said code comprising:
message-specific speech procurement code processable to procure message-specific data representing said variable portion;
carrier speech retrieval code processable to retrieve carrier speech data from a carrier speech store;
transition data generating code processable to generate, on the basis of said carrier speech data and said message-specific speech data, transition data representing a transition audio portion;
concatenation code processable to form said voice message data by concatenating one of said carrier speech data and said message-specific speech data, said transition data, and the other of said carrier speech data and said message-specific speech data to form said voice message-representing data.

13. A program storage device readable by a processing apparatus, said device tangibly embodying a program of instructions executable by the processor to perform method steps for:
obtaining a carrier speech signal representing at least a major part of the invariable portion;
obtaining a message-specific speech signal representing at least the variable portion;
generating a transition signal on the basis of said carrier and message-specific signals;
forming said voice message signal by concatenating one of said carrier signal and said message-specific signal, said transition signal and the other of said carrier and said message-specific signal.

14. A method of generating a voice message sample sequence representing all or part of a message comprising a variable portion and an invariable portion, said method comprising:
obtaining a recorded carrier speech sample sequence representing at least a major part of the invariable portion;
obtaining a message-specific speech sample sequence representing at least the variable portion;
generating a transition sample sequence on the basis of the carrier speech sample sequence and the message-specific speech sample sequence;
forming the voice message sample sequence by concatenating all or part of either the carrier speech sample sequence or the message-specific speech sample sequence, said transition sample sequence and all or part of the other of said carrier speech sample sequence and the message-specific speech sample sequence.

15. A method as in claim 14 further comprising the step of:
truncating one or both of the carrier speech sample sequence and the message-specific speech sample sequence to the extent that the total length removed is substantially equal to the length of the transition.

16. A method as in claim 14 wherein:
said transition sample sequence generating step involves the generation of a transition sample sequence which represents a transition audio portion whose pitch varies from having an initial pitch similar to the end of the leading one of said carrier speech sample sequence and said message-specific speech sample sequence to having a final pitch similar to the beginning of the trailing one of the carrier speech sample sequence and the message-specific speech sample sequence.

17. A method as in claim 14 wherein said transition sample sequence generating step comprises:
generating a plurality of transition pitchmarks, the spacing of which represents the pitch of a transition audio portion represented by said transition sample sequence;
windowing the carrier speech sample sequence to provide carrier speech short-term sample sequence;
windowing the message-specific speech sample sequence to provide message-specific speech short-term sample sequences; and
mapping the carrier speech short-term sample sequences and the message-specific short-term sample sequences onto said transition pitchmarks to generate the transition sample sequence.

18. A method as in claim 17 wherein said transition pitchmark providing step involves a linear interpolation between the pitch of the voice message on either side of the transition audio portion.

19. A method as in claim 17 wherein said mapping comprises mapping a combination of a carrier speech short-term sample sequence and a message-specific speech short-term sample sequence to one or more of said plurality of transition pitchmarks.

20. A method as in claim 14 wherein the transition audio portion is located around the center of a phoneme of the invariable portion, which phoneme is closest to the boundary between the invariable portion and the variable portion of the voice message.

21. A method of generating a voice message-representing sample sequence from a text-representing signal, said method comprising:
obtaining a leading sample sequence corresponding to a leading portion of said text-representing signal;
obtaining a trailing sample sequence corresponding to a trailing portion of said text-representing signal;
wherein:
said leading sample sequence represents a first voice and said trailing sample sequence represents a second voice, said first voice and said second voice each representing one of variable and invariable speech which are discernibly differing in respect of at least one quality;
at least a major portion of said leading sample sequence represents a first voice message portion; and
at least a major portion of said trailing sample sequence represents a second voice message portion;
said method further comprising the steps of:
generating, on the basis of said leading sample sequence and said trailing sample sequence, a transition sample sequence representing a transition audio portion, which audio portion varies from having an initial pitch similar to that of the end of said first voice message portion to having a final pitch similar to that of the beginning of the second voice message portion; and
concatenating said at least major portion of said leading sample sequence, said transition sample sequence and said at least major portion of said trailing sample sequence in providing said voice message-representing sample sequence.

22. Apparatus for generating a voice message sample sequence representing a message comprising a variable portion and an invariable portion, said apparatus comprising:
means arranged in operation to receive a carrier speech sample sequence representing at least a major part of the invariable portion;
means arranged in operation to receive a message-specific speech sample sequence representing at least the variable portion;
means arranged in operation to generate a transition sample sequence on the basis of said carrier and message-specific sample sequences;
means arranged in operation to form said voice message sample sequence by concatenating one of said carrier sample sequence and said message-specific sample sequence, said transition sample sequence and the other of said carrier and said message-specific sample sequence.

23. A text to speech conversion apparatus including a voice message sample sequence generator as in claim 22.

24. A voice operated database inquiry apparatus including a text to speech conversion apparatus as in claim 23.

25. Apparatus for generating voice message data representing a voice message having a variable portion and an invariable portion, said apparatus including:
a storage medium having recorded therein processor readable code processable to generate said voice message data, said code comprising:
message-specific speech procurement code processable to procure message-specific data representing said variable portion;
carrier speech retrieval code processable to retrieve carrier speech data from a carrier speech store;
transition data generating code processable to generate, on the basis of said carrier speech data and said message-specific speech data, transition data representing a transition audio portion;
concatenation code processable to form said voice message data by concatenating one of said carrier speech data and said message-specific speech data, said transition data, and the other of said carrier speech data and said message-specific speech data to form said voice message-representing data.

26. A program storage device readable by a processing apparatus, said device tangibly embodying a program of instructions executable by the processor to perform method steps for:
obtaining a carrier speech sample sequence representing at least a major part of the invariable portion;
obtaining a message-specific speech sample sequence representing at least the variable portion;

generating a transition sample sequence on the basis of said carrier and message-specific sample sequence;

forming said voice message sample sequence by concatenating one of said carrier sample sequence and said message-specific sample sequence, said transition sample sequence and the other of said carrier and said message-specific sample sequence.

27. A method for generating a voice message having an invariable recorded carrier portion and a message-specific variable synthesized portion, said method comprising:

concatenating adjacent leading and trailing segments of phoneme-representing speech signal samples for said portions without a discernible pause therebetween in the time domain; and including in said concatenation transition phoneme-representing speech signal samples distributed across the joined segments to effect a smoothed change in at least one speech quality signal component that would otherwise be discernibly different between said portions to a listener.

28. A method as in claim 27 wherein said transition signals are distributed between points representing the approximate centers of adjacent phonemes of said concatenated invariable and variable portions.

29. A method as in claim 28 wherein said transition signals are generated by mapping phoneme-representing speech signal samples of at least some of both the variable and invariable portions onto each other as modified by a pre-defined transition window function.

30. A method as in claim 27 wherein:

said variable synthesized portion has been selected as part of a larger synthesized phrase.

31. A method as in claim 30 wherein said invariable portion has been selected as part of a larger phrase which includes one possible choice for the variable portion.

32. A method as in claim 27 wherein said invariable portion has been selected as part of a larger phrase which includes one possible choice for the variable portion.

\* \* \* \* \*